(12) United States Patent
Sorokin et al.

(10) Patent No.: US 8,884,093 B2
(45) Date of Patent: Nov. 11, 2014

(54) METHOD OF TREATING EFFLUENTS CONTAINING HALOGENATED COMPOUNDS

(75) Inventors: Alexander Sorokin, Fontaine St Martin (FR); Evgeny V. Kudrik, Villeurbanne (FR)

(73) Assignees: Centre National de la Recherche Scientifique (C.N.R.S.), Paris (FR); Universite Claude Bernard Lyon 1, Villeurbanne (FR)

( * ) Notice: Subject to any disclaimer, the term of this patent is extended or adjusted under 35 U.S.C. 154(b) by 70 days.

(21) Appl. No.: 13/639,791

(22) PCT Filed: Apr. 6, 2011

(86) PCT No.: PCT/FR2011/050771
§ 371 (c)(1),
(2), (4) Date: Oct. 30, 2012

(87) PCT Pub. No.: WO2011/124843
PCT Pub. Date: Oct. 13, 2011

(65) Prior Publication Data
US 2013/0041200 A1 Feb. 14, 2013

(30) Foreign Application Priority Data
Apr. 7, 2010 (FR) ...................................... 1052626

(51) Int. Cl.
| | | |
|---|---|---|
| *A62D 3/36* | (2007.01) |
| *B01J 31/18* | (2006.01) |
| *C02F 1/72* | (2006.01) |
| *C02F 101/12* | (2006.01) |
| *C02F 101/14* | (2006.01) |

(52) U.S. Cl.
CPC ........ *B01J 31/1815* (2013.01); *B01J 2531/025* (2013.01); *B01J 2231/70* (2013.01); *C02F 1/725* (2013.01); *C02F 2101/12* (2013.01); *B01J 2531/0216* (2013.01); *C02F 1/722* (2013.01); *B01J 2531/842* (2013.01); *C02F 2101/14* (2013.01)
USPC ........................... 588/318; 588/402; 588/406

(58) Field of Classification Search
USPC .......... 588/316, 318, 320, 402, 405, 406, 415
See application file for complete search history.

(56) References Cited

U.S. PATENT DOCUMENTS 5,877,389 A    3/1999  Sorokin et al.

OTHER PUBLICATIONS

Afanasiev, P. et al., 2009, "Stable N-Bridged Diiron(IV) Phthalocyanine Cation Radical Complexes: Synthesis and Properties," *Dalton Transactions*, pp. 9828-9836.
Meunier, B. et al., 1997, "Oxidation of Pollutants Catalyzed by Metallophthalocyanines," *Accounts of Chemical Research*. 30: 470-476.
Sorokin, A. et al., 1995, "Efficient Oxidative Dechlorination and Aromatic Ring Cleavage of Chlorinated Phenols Catalyzed by Iron Sulfophthalocyanine," *Science*. 268: 1163-1166.
Sorokin, A. et al., 2002, "Selective Oxidation of Aromatic Compounds with Dioxygen and Peroxides Catalyzed by Phthalocyanine Supposed Catalysts," *Journal of Molecular Catalysis A: Chemical*, 182-183: 267-281.

*Primary Examiner* — Edward Johnson
(74) *Attorney, Agent, or Firm* — Knobbe, Martens, Olson & Bear, LLP

(57) ABSTRACT

The present invention relates to the use of catalysts of general formula (I):

$$(L_1)M_1\text{-}X\text{-}M_2(L_2) \quad \quad (I)$$

wherein:
$M_1$ and $M_2$, either identical or different, represent metal atoms;
X represents a nitrogen atom;
$L_1$ and $L_2$, either identical or different are coordinated with $M_1$ and $M_2$, respectively, and represent ligands of the tetradentate type,
for catalytic oxidation of halogenated compounds.

16 Claims, No Drawings

METHOD OF TREATING EFFLUENTS CONTAINING HALOGENATED COMPOUNDS

The present invention relates to a method for treating effluents comprising halogenated compounds, this method comprising a catalytic oxidation step.

Halogenated compounds are widely used in many applications. However, it is very difficult to degrade these compounds biologically because of the high stability of the carbon-halogen bonds. The accumulation of these harmful compounds in nature poses a highly significant environmental problem.

Among the most stable and chemically inert compounds, mention may notably be made of fluorinated compounds and of chlorofluorocarbons (CFCs or freons), well known for their responsibility in the destruction of the ozone layer and the lifetime of which is extremely long. Presently, about 40% of the products used in agriculture and 20% of drugs contain fluorine (V. V. Grushin, Acc. Chem. Res. 43, 160-171 (2010)). The development of efficient and economic methods for treating these compounds is of vital importance.

Present methods for transforming carbon-halogen bonds are based on organometallic activation and on reduction. Activation of carbon-fluorine bonds with these examples has notably been the subject of a review (*Chem. Rev.*, 109, 2119-2183 (2009)), but this work only relates to not very fluorinated molecules. Further, transformation of fluorinated compounds by organometallic activation requires catalysts which are accessible with difficulty, especially at the large scale, as well as strictly anhydrous and inert conditions.

To this day, no catalytic chemical system exists, capable of degrading highly halogenated compounds, in particular fluorinated compounds, via an oxidation route under mild conditions.

For a long time, natural degradation of halogenated compounds by micro-organisms was therefore relied upon in order to solve the environmental problems posed by these compounds. Nevertheless, biodegradation often proves to be insufficient, especially in the case of extremely stable, highly halogenated aromatic compounds. Presently, the industrial approach for treating this type of compound is high temperature incineration.

It therefore appears that as regards treatment of halogenated compounds, a clean and inexpensive efficient alternative is still lacking.

One of the objects of the present invention is to provide a method for degrading halogenated compounds, which are particularly difficult to oxidize, in a way as economical as possible, and meeting the goals of protecting the environment.

The object thereof is also to provide a method carried out under mild and energy-sparing conditions, applying a catalyst which is tolerant towards water and air, as well as a clean and non-toxic oxidizer.

The object of the present invention is also to allow degradation of notoriously stable and harmful halogenated compounds of industrial effluents (in an organic or aqueous phase) or from waste waters.

The present invention relates to the use of catalysts of the general formula (I):

$$(L_1)M_1\text{-}X\text{-}M_2(L_2) \qquad (I)$$

wherein:
M$_1$ and M$_2$, either identical or different, represent metal atoms;

X represents an atom selected from the group consisting of nitrogen, oxygen and carbon atoms;
L$_1$ and L$_2$, either identical or different, are coordinated with M$_1$ and M$_2$, respectively and represent ligands of the tetradentate type, for catalytic oxidation of halogenated compounds.

The use of such catalysts for oxidizing highly halogenated compounds had not yet up to now been considered since these compounds, which are electron-defficient because of the large electro-negativity of halogens (in particular that of chlorine and especially fluorine), are extremely difficult to oxidize. Up to now, there is no catalytic system allowing oxidation of carbon-fluorine bonds under mild conditions.

Within the scope of the invention, by "degradation" is meant a reaction consisting of breaking one or several bonds of a molecule, which often breaks up this molecule into several smaller molecules. The degradation of halogenated compounds in particular designates the breaking of carbon-halogen bonds of said halogenated compounds in order to notably obtain halide anions.

Within the scope of the invention, by "halogenated compounds" are meant organic compounds substituted with at least one halogen atom, in particular fluorine, chlorine, bromine and iodine atoms and more particularly fluorine and chlorine atoms. By halogenated compounds are also meant organic C$_5$-C$_{30}$ compounds including at least one aromatic or heteroaromatic ring, said ring being substituted with at least one halogen atom (halogenated aromatic compounds), or also compounds substituted with several halogen atoms (polyhalogenated compounds). Among these halogenated compounds, mention may notably be made of tetrafluoro-1,4-benzoquinone (fluoranil), phenyls substituted with fluorine and/or chlorine atoms (for example pentafluorophenol, hexafluorobenzene, octafluorotoluene, octafluoronaphthalene, 1,3,5-trichloro-2,4,6-trifluoro-benzene, trichlorophenol, hexachlorobenzene, dichlorobenzene, polychlorodibenzo-p-dioxins, polychlorodibenzofuranes and polychlorobiphenyls), pyridines substituted with fluorine and/or chlorine atoms (for example pentafluoropyridine, pentachloropyridine).

By halogenated compounds are also meant organic aliphatic C$_1$-C$_{10}$ compounds including at least one halogen atom (halogenated aliphatic compounds), or also compounds substituted with several halogen atoms (polyhalogenated aliphatic compounds). Among these halogenated compounds, mention may notably be made of dichloromethane, chloroform, 1,1,1-trichloroethane, and generally volatile halogenated solvents, in particular volatile chlorinated solvents.

Within the scope of the invention, by "halogen atoms" are meant the elements Cl, F, Br and I, and more particularly Cl and F.

Within the scope of the invention, by "halide anions" are meant the anions Cl$^-$, F$^-$, Br$^-$ and I$^-$, and more particularly Cl$^-$, F$^-$.

For this purpose, the invention proposes the use of metal binuclear catalysts with tetradentate macrocylic ligands in the presence of an oxidizer.

Within the scope of the present invention, the inventors have surprisingly observed the efficiency of such catalysts in the presence of an oxidizer in reactions for oxidation of halogenated compounds.

Within the scope of the invention, by "metal atoms" are meant the elements corresponding to transition metals in their different oxidation states (positive oxidation number).

Thus, the catalysts of the invention of general formula (I) are also designated as "metal binuclear catalysts".

Within the scope of the invention, by "metal binuclear catalysts" is meant a polyatomic structure consisting of two metal cations or atoms, each metal cation or atom (also designated as a central cation or atom) being surrounded by a ligand which delocalizes a portion of its electron density onto the cation or the atom thereby forming chemical bonds with the latter. This is then referred to as coordination between the ligand and the central atom or cation, the ligands-metals assembly forming an organometallic coordination complex.

Within the scope of the invention, by "tetradentate macrocyclic ligand" or tetradentate ligand is meant a cyclic macromolecule bearing chemical functions allowing it to be bound to a central atom or cation as defined above. It is said that the chemical functions are coordinated with the central atom or cation.

The atom X forms a bridge between both metal atoms. Within the scope of the invention, this type of complex is called a µ type complex. When X represents a nitrogen atom, this is referred to as a µ-nitrido complex; when X represents an oxygen atom, this is referred to as a µ-oxo complex; when X represents a carbon atom, this is referred to as a µ-carbido complex; when X represents a sulfur atom, this is referred to as a µ-thio complex.

According to an embodiment of the invention, X represents a nitrogen atom.

Within a scope of the invention, by "catalytic oxidation" is meant an oxidation reaction catalyzed by the action of a substance called a catalyst which modifies the reaction rate. The catalyst is in a much smaller amount than the reagents, is not consumed and is found unchanged at the end of the reaction.

Within the scope of the present invention, by "catalyst", is meant a chemical species which, in an initial state, interacts with the reagents of a chemical reaction in order to accelerate the formation of the products of this reaction, and which is found again in the same initial state at the end of the reaction.

Degradation by catalytic oxidation of halogenated compounds convert these compounds which may be biodegraded with difficulty and/or are toxic, into biodegradable and/or non-toxic oxidized compounds. During this degradation, the carbon-halogen bonds of said halogenated compounds are broken in order to give an oxidized organic compound on the one hand and one or several halide anions each bearing a negative charge on the other hand. The transformation of organic halogens into inorganic halogens is called "mineralization"; it is also said that the thereby treated halogenated compounds are mineralized.

The present invention in particular relates to the use of catalysts such as described earlier for catalytic oxidation of halogenated aromatic compounds.

Within the scope of the invention, by "halogenated aromatic compounds" are meant organic compounds including at least one aromatic or heteroaromatic ring, said ring being substituted with at least one halogen atom (halogenated aromatic compounds) in particular with fluorine, chlorine, bromine and iodine atoms, and more particularly with fluorine and chlorine atoms. These compounds are particularly stable and difficult to degrade.

Degradation by catalytic oxidation of aromatic halogenated compounds converts these compounds which may be biodegraded with very great difficulty and/or are toxic, into non-aromatic oxidized compounds, which are more easily biodegradable and/or non-toxic.

The present invention also relates to the use of catalysts as described earlier for catalytic oxidation of halogenated aliphatic compounds.

Within the scope of the invention, "halogenated aliphatic compounds" are meant organic aliphatic compounds including at least one halogen atom, in particular fluorine, chlorine, bromine and iodine atoms, and more particularly fluorine and chlorine atoms, advantageously chlorine atoms. These compounds are particularly stable and difficult to degrade.

Degradation by catalytic oxidation of aliphatic halogenated compounds converts these compounds which may be biodegraded with very great difficulty and/or are toxic, into non-halogenated oxidized compounds, which are more easily biodegradable and/or non-toxic.

According to a particular embodiment of the invention, said ligands $L_1$ and $L_2$ comprise nitrogen-containing functions, notably imine functions, the nitrogen atoms of which are coordinated with $M_1$ and $M_2$ respectively.

The ligands $L_1$ and $L_2$ may also contain both nitrogen-containing functions and oxygen-containing functions (such as for example Schiff bases), the nitrogen and/or oxygen atoms of which are coordinated with $M_1$ and $M_2$ respectively.

The chemical bonds between the ligand $L_1$ and the metal $M_1$ and the bonds between $L_2$ and $M_2$ are therefore preferentially made via nitrogen atoms borne by imine functions. As the ligands are of the tetradentate type, they are therefore coordinated with the metal through at least one and at most four imine functions.

Within the scope of the invention, by "imine functions" is meant a functional group characterized by a carbon-nitrogen double bond, said nitrogen atom being bound by means of its third valence electron to a hydrogen atom or an alkyl group, said carbon atom forming two other simple bonds by means of its third and fourth valence electrons.

According to a particular embodiment of the invention, said catalysts are used for treating effluents comprising halogenated compounds.

Within the scope of the invention, by "effluents" are notably meant waste waters, also called polluted waters, i.e. all the waters which are able to contaminate the media into which they are poured. These waters are generally the byproduct of human domestic, industrial, small scale, agricultural or other use. They are considered as polluted and have to be treated. By effluents are also meant all the organic phases making up industrial waste, comprising toxic compounds which have to be treated.

The object of the present invention is thus the treatment of halogenated compounds comprising in both of these types of effluents (notably industrial effluents) whether in an aqueous or organic phase.

According to a particular embodiment of the invention, said oxidation is carried out in the presence of $H_2O_2$ as an oxidizer.

Hydrogen peroxide ($H_2O_2$), commonly called oxygenated water, is a chemical compound with powerful oxidizing properties. Its concentration is sometimes indicated in percent, a standard 35% solution corresponding to about 11.4 M. Oxygenated water has the advantage of being a clean, inexpensive and widely used oxidizer in industry (industrial name: perhydrol). Indeed, the reduction production product of $H_2O_2$ reacting as an oxidizer is $H_2O$:

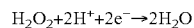

$$H_2O_2 + 2H^+ + 2e^- \rightarrow 2H_2O$$

Further, the $H_2O_2$ dismutation reaction is slow and aqueous solutions of hydrogen peroxide may be kept for a long time.

According to a particular embodiment of the invention, said catalysts are of formula (I) as described earlier, wherein:

$M_1$ and $M_2$, either identical or different, represent an atom selected from the group consisting of transition metals, notably iron, copper, ruthenium, manganese, chromium, vanadium, osmium and cobalt;

X represents a nitrogen atom;

$L_1$ and $L_2$, either identical or different, fit the general formula (II):

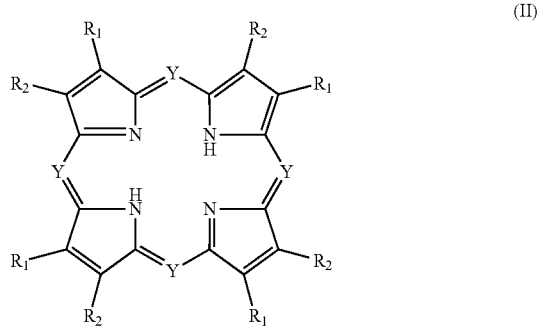

wherein:

$R_1$ and $R_2$ independently of each other, represent a group selected from the group consisting of: H, phenyl, alkyl and halogen;

or else form, with the two carbon atoms to which they are bound, a phenyl group or a heterocycle containing one or two nitrogen atoms, optionally substituted with one or several substituents selected from the group consisting of halogen, alkyl, alkoxy, nitro, carboxyl, hydroxyl, sulfone, sulfonic and sulfonate groups;

Y represents a nitrogen atom or a CR group, wherein R represents a hydrogen atom or a substituent selected from the group consisting of halogen, alkyl, phenyl groups, optionally substituted with one or several substituents selected from the group consisting of halogen, alkyl, alkoxy, nitro, carboxyl, hydroxyl, sulfone, sulfonic and sulfonate groups.

The thereby defined ligands $L_1$ and $L_2$ are ligands of the "porphyrin" type.

In formula (II), when Y=CR and $R_1$ and $R_2$ independently of each other represent a group selected from the group consisting of: H, nitro and halogen, these are referred to as porphyrins.

In formula (II), when Y=CR and $R_1C$=$CR_2$=Ph, these are referred to as tetrabenzoporphyrins.

In formula (II), when Y=N and $R_1$=$R_2$=H, these are referred to as porphyrazines.

In formula (II), when Y=N and $R_1C$=$CR_2$=Ph, these are referred to as phthalocyanines.

According to a preferred embodiment of the invention, Y=C-Ph and $R_1$ and $R_2$ both represent hydrogen atoms (p-nitrido dimer of iron tetraphenylporphyrin, noted as $(FeTPP)_2N$).

Within the scope of the invention, the atoms $M_1$ and $M_2$ are considered in their different oxidation states (positive oxidation number).

Within the scope of the invention, by "alkyl" is meant a saturated alkyl chain of the linear or branched type, comprising from 1 to 18 carbon atoms.

Within the scope of the invention, by "alkoxy" is meant a saturated alkyl chain comprising from 1 to 18 carbon atoms, bound to an oxygen atom.

According to a particular embodiment of the invention, the catalysts are of formula (I) as described earlier, wherein:

$M_1$ and $M_2$ both represent an iron atom;

$R_1$ and $R_2$ form, with both carbon atoms to which they are bound, a phenyl group, optionally substituted with one or more substituents selected from the group consisting of halogen, alkyl, alkoxy, nitro, carboxyl, hydroxyl, sulfone, sulfonic and sulfonate groups;

Y represents a nitrogen atom.

Within the scope of the invention, an iron atom is considered in its different oxidation states (positive oxidation number).

In this preferred embodiment of the invention, the ligands are of the phthalocyanine type (Pc), low cost compounds, easily accessible on an industrial scale. The iron µ-nitrido phthalocyanine binuclear catalysts are then noted as $(FePc)_2N$. The first complexes of this type were synthesized in 1985 (Ercolani et al. *Inorg. Chem.*, 24, 3733-3737 (1985)). These complexes are stable in the presence of water, air and even of strong oxidizers such as $H_2O_2$ for example, but have never been mentioned as an oxidation catalyst.

According to a preferred embodiment of the invention, $R_1$ and $R_2$ form, with the two carbon atoms to which they are bound, a phenyl group substituted with hydrogen atoms (complex noted as $(FePc)_2N$), with alkyl groups, in particular with tert-butyls (complex noted as $(FePc^tBu_4)_2N$) or with sulfonic groups —$SO_3H$ (complex noted as $(FePcS)_2N$).

The present invention relates to the method for treating effluents comprising halogenated compounds, comprising the oxidation of the halogenated compounds in the presence of an oxidizer and of a catalyst of general formula (I) as defined earlier.

Within the scope of the invention, by "oxidizer", is meant an organic or mineral compound capable of oxidizing other compounds, i.e. of capturing one or more electrons of these compounds.

Among the usual mineral oxidizers, mention may notably be made of perchlorates, hyperchlorites, nitrates, chromates, permanganates, in particular $Cl_2$, $Br_2$, $CrO_3$, $CrO_2Cl_2$, $K_2Cr_2O_7$, $Ca(OCl)_2$, $HClO_4$, $HNO_3$, $KMnO_4$, $K_2O_2$, $N_2O_4$, $Na_2O_2$, $F_2O_2$, $I_2O_7$, $RuO_4$, $AgClO_4$, $O_2$, $O_3$, $H_2O_2$.

Among the usual organic oxidizers, mention may notably be made of m-CPBA, $SO_3$.py complexes, pyridinium chlorochromate (PCC) and pyridinium dichromate (PDC), 2,3-dichloro-5,6-dicyano-1,4-benzoquinone (DDQ), Dess-Martin periodinane and iodoxybenzoic acid (IBX).

According to a particular embodiment of the invention, the aforementioned method comprises the following steps:

(a) putting the effluents in the presence of an oxidizer and of a catalyst of formula (I) as defined earlier; and (b) catalytic oxidation of said halogenated compounds in order to obtain oxidized compounds.

Additional steps for recovering and recycling the catalyst may also be applied. The catalyst which is a heterogeneous catalyst may be recovered by filtration for example.

The oxidized compounds may, if need be, be recovered in order to be treated with conventional methods for treating waste.

Within the scope of the invention, by putting different reagents in presence is meant the fact of putting said reagents in contact in a same reactor in order to obtain a homogeneous or heterogeneous mixture in which the chemical reaction between said reagents will take place.

With the method, it is possible to treat organic effluents (treatment of industrial waste) or aqueous effluents (treatment of waste water).

According to a preferred embodiment, the applied oxidizer in the method of the present invention is a $H_2O_2$.

According to a particular embodiment of the invention, said catalyst is of formula (I) as described earlier, wherein:

$M_1$ and $M_2$ both represent an iron atom;

$R_1$ and $R_2$ form with both carbon atoms to which they are bound, a phenyl group, optionally substituted with one or more substituents selected from the group consisting of halogen, linear or branched alkyl, alkoxy, nitro, carboxyl, hydroxyl, sulfone, sulfonic and sulfonate groups;

Y represents a nitrogen atom.

According to a particular embodiment of the invention, said effluents comprise halogenated aromatic compounds, preferably fluorinated aromatic compounds.

By halogenated aromatic compounds are meant compounds including aromatic or heteroaromatic rings, said rings being substituted with at least one halogen atom (in particular a chlorine or fluorine atom).

Preferably, these compounds are polyhalogenated, i.e. they comprise at least two halogen atoms (preferably chlorine or fluorine atoms).

According to an embodiment, said effluents comprise polyfluorinated compounds, preferably polyfluorinated aromatic compounds.

As polyfluorinated compounds which may be treated with the catalysts of the invention, mention may be made for example of pentafluorophenyl, fluoranil, hexafluorobenzene, pentafluoropyridine, octafluorotoluene and octafluoronaphthalene.

According to an embodiment, said effluents comprise polychlorinated compounds, preferably polychlorinated aromatic compounds.

As polychlorinated compounds, which may be treated with the catalysts of the invention, mention may for example be made of 2,4,6-trichlorophenol, dichlorobenzene and hexachlorobenzene.

Mention may also be made of polychlorodibenzo-p-dioxins (PCDDs, also called dioxins) such as for example 2,3,7,8-tetrachlorodibenzo-p-dioxin, polychlorodibenzo-furanes (PCDFs) and polychlorobiphenyls (PCBs), which are known as being highly toxic pollutants and resistant to usual treatment and degradation methods.

According to an embodiment of the invention, said effluents comprise polychlorinated and polyfluorinated compounds, preferably polychlorinated and polyfluorinated aromatic compounds.

As polychlorinated and polyfluorinated compounds which may be treated with the catalyst of the invention, mention may for example be made of 1,3,5-trichloro-2,4,6-trifluoro-benzene.

According to an embodiment, said effluents do not comprise any halogenated solvents.

In the case of effluents comprising halogenated solvents, such as for example $CH_2Cl_2$ ($T_{bp}$=40° C. under 1 atm), $CHCl_3$ (62° C.), $CCl_4$ (77° C.), trichloroethylene (87° C.) or chlorobenzene (132° C.), the latter are removed beforehand from the effluents before the treatment with said method, notably by evaporation under reduced pressure.

According to another embodiment of the invention, said effluents comprise halogenated solvents, such as for example chlorinated aliphatic solvents.

As chlorinated aliphatic solvents, which may be treated with the catalyst of the invention, mention may for example be made of dichloromethane, chloroform and 1,1,1-trichloroethane.

According to a particular embodiment of the invention, said "catalyst is supported" preferably on silica, aluminium oxide or coal.

Within the scope of the invention, by supported catalyst is meant a catalyst immobilized at the surface of an organic (polymer) or inorganic substance, in particular silica, aluminium oxide or coal, which is called a support.

A supported catalyst is a heterogeneous catalyst which is found in the solid state while the reactive phase of said method is a solution (mixture of the effluents and of the oxidizer). The reagents bind to the surface of the catalyst where the reaction takes place. It is therefore sought to maximize the specific surface area of the supported catalyst.

Heterogeneous catalysts supported on an inorganic support may easily be recovered, for example by filtration, so as to be re-used and/or recycled subsequently. Said catalyst may be applied for treating organic effluents (treatment of industrial waste) or aqueous effluents (treatment of waste water).

According to a preferred embodiment of the invention, the ratio between the amount of catalyst (in mol) and the amount of halogenated compounds (in mol) is less than 0.1, preferably less than 0.01.

Indeed, it is sought to minimize the amount of catalyst in order to reduce the costs of the method. It is estimated that a catalyst is actually in a "catalytic amount" when it is present in a proportion of less than 5%, preferably less than 1%, based on the reagents.

According to a particular embodiment of the invention, the ratio between the amount of oxidizer (in mol) and the amount of halogenated compounds (in mol) is less than 10,000, preferably less than 100.

Indeed, it is sought to minimize the amount of oxidizer in order to reduce the cost of the method. This amount depends on the concentration of halogenated compounds in the effluents. For concentrated effluents, the oxidizer excess will be relatively low. For not very concentrated effluents, the oxidizer excess will be larger.

According to a particular embodiment of the invention, said step (b) is carried out at a temperature comprised from 10° C. to 100° C., more particularly between 20° C. and 60° C.

The conditions of the method are therefore mild (20-60° C.) and energy-sparing.

According to a particular embodiment of the invention, the duration of said step (b) is comprised from 30 mins to 24 hours.

This duration varies according to the halogenated compounds. However, it sought to minimize it in order to increase the efficiency of the method.

The invention will be still further illustrated with view to the examples described hereafter.

EXAMPLES

Preparation of the Catalysts

The catalysts (FePc'$Bu_4$)$_2$N, (FePc)$_2$N and (FeTPP)$_2$N, used in the following examples were obtained according to a method comprising the following steps (cf. *J. Am. Chem. Soc.* 98, 1747-1752 (1976); *Chem. Commun.* 2562-2564, (2008); *Inorg. Chem.*, 24, 3733-3737 (1985)):

adding $NaN_3$ to a solution of iron phtalocyanine or porphyrin in a solvent with a high boiling point (for example xylene) in order to obtain a mixture, heating the mixture with stirring and reflux and under an inert atmosphere (for example under argon), filtering the mixture, purification of the complex contained in the filtrate, preferably by chromatography, preferably on neutral alumina ($Al_2O_3$).

The complex $(FePcS)_2N$ illustrates a mixture of several sulfonated complexes, with different sulfonation levels of phtalocyanines. This complex was obtained by heating a dimer $(FePc)_2N$ in chlorosulfonic acid at 150° C. for 6 h. The reaction mixture is then poured onto ice and the formed precipitate was isolated by filtration and then washed with water. The solid was then dried at 70° C. The —$SO_2Cl$ groups hydrolyze spontaneously into sulfonic groups —$SO_3H$, so that a mixture of sulfonated water-soluble complexes is obtained, each including between 2 and 8 sulfonic groups —$SO_3H$. This mixture is noted as $(FePcS)_2N$.

Example 1

Oxidation with homogeneous catalysis was performed with the catalyst $(FePc^tBu_4)_2N$ and with $H_2O_2$ as an oxidizer, in acetonitrile for 3 h at 60° C., with $[(FePc^tBu_4)_2N]$=0.2 mM, [fluorinated compound]=0.1 M and $[H_2O_2]$=0.4 M, i.e. the (catalyst/substrate/oxidizer) ratio=(1/500/2,000).

The results of oxidation of the different fluorinated compounds are gathered in Table 1.

TABLE 1

Oxidation of fluorinated compounds in homogeneous catalysis ($CH_3CN$, 3 h, 60° C.)

| Substrate: Halogenated compounds | Conversion, % | TON | Inorganic $F^-$ per converted substrate | Identified products |
|---|---|---|---|---|
| Pentafluorophenol | 47 | 235 | 3.4 | $F^-$, fluoranil |
| | 88 (20° C., 24 h) | 440 | 4.2 | |
| Fluoranil | 44 (1 h) | 220 | 3.6 | $F^-$ |
| Hexafluorobenzene | 26 | 130 | 4.6 | $F^-$, fluoranil pentafluorophenol |
| | 49 (under Ar) | 245 | 2.9 | |
| Pentafluoropyridine | 19 | 95 | 2.8 | $F^-$, phenols, N-oxide |
| Octafluorotoluene | 22 | 110 | 3.5 | $F^-$ heptafluorocresols |

The TON (Turn-Over Number) is the number of moles of substrate which one mole of catalyst may convert during the time of the reaction. The larger the TON, the more performing is the catalyst.

Example 2

Oxidation with homogeneous catalysis of pentafluorophenol was performed with the catalyst $(FePcS)_2N$ and with $H_2O_2$ as an oxidizer, in water for 6 hours at 60° C., with $[(FePcS)_2N]$=0.2 mM, [pentafluorophenol]=0.2 M and $[H_2O_2]$=0.8 M, i.e. the (catalyst/substrate/oxidizer) ratio=(1/1,000/4,000).

The conversion of the reaction is 42% (TON=420). Each transformed molecule of pentafluorophenol gave 4.6 inorganic fluoride anions. Fluoride anions were the main oxidation product and difluoromaleic acid was the minority product. Each molecule of catalyst transforms 1,925 atoms of organic fluorine into inorganic fluorine.

The supported catalysts used in the following examples were obtained according to a method comprising the following steps: (cf. J. Porphyrins Phtalocyanines, 12, 1078-1089 (2008)):

putting into presence the catalyst complex and the support in dichloromethane in order to obtain a mixture, stirring the mixture at room temperature, evaporating the solvent under reduced pressure in order to obtain a solid, drying the solid in vacuo.

Example 3

The oxidation with heterogeneous catalysis of pentafluorophenol (0.4 mmol) was performed with the catalyst $(FePc)_2N$ supported on coal or on silica (36 mg) and with $H_2O_2$ (1.6 mmol) as an oxidizer, in $D_2O$, at 60° C. and in an air atmosphere, the reaction was tracked with $^{19}F$ NMR.

The analysis of the reaction solution with $^{19}F$ NMR after 14 hours showed an 87% conversion of pentafluorophenol, a 93% mineralization level (fluoride after reaction/initial organic fluorine) and a TON of 809 cycles per molecule of catalyst. Each catalyst molecule transforms 3,762 organic fluorine atoms into inorganic fluorine atoms.

Example 4

Oxidation with heterogeneous catalysis of hexafluorobenzene (0.018 mmol) was performed with the catalyst $(FePc)_2N$ supported on coal (30 mg) and with $H_2O_2$ (1.6 mmol) as an oxidizer, in 2 mL of a 0.1 M sulfuric acid solution at 60° C. and under an air atmosphere, the reaction being followed with $^{19}F$ NMR.

The analysis of the reaction solution with $^{19}F$ NMR after 14 hours showed 94% conversion of hexafluorobenzene and 82% mineralization level of (fluoride after reaction/initial organic fluorine).

Example 5

The oxidation with heterogeneous catalysis of different polyfluorinated compounds was performed in the presence of catalysts $(FePc)_2N$ or $(FePc^tBu_4)_2N$ supported on coal and with $H_2O_2$ as an oxidizer, in water (2 mL) and at 60° C. as indicated in Table 2.

The first case mimics industrial effluents which comprise highly halogenated pollutants in a strong concentration (pentafluorophenol, 0.1 M).

The second case shows that this system may be used for treating small concentrations of these unmanageable pollutants which are found in waste waters (hexafluorobenzene 0.009 M).

The results are gathered in Table 2.

TABLE 2

Oxidation of polyfluorinated compounds with heterogeneous catalysis

| Polyfluorinated compounds (initial concentration) | Pentafluorophenol (0.1M) | Pentafluorobenzene (0.009M) | Pentafluoropyridine (0.05M) | 1,3,5-Trichloro-2,4,6-trifluorobenzene (0.1M in MeCN) |
|---|---|---|---|---|
| Catalyst, amount | (FePc$^t$Bu$_4$)$_2$N 20 mg | (FePc)$_2$N 30 mg | (FePc)$_2$N 30 mg | (FePc$^t$Bu$_4$)$_2$N 24 mg |
| [H$_2$O$_2$] | 2.6M | 0.82M | 0.82M | 1.6M |
| Conversion | 99% | 94% | 46% | 89% |
| TON | 990 | 47 | 126 | 307 |

Example 6

The oxidation with heterogeneous catalysis of pentafluorophenol (0.3 mmol) was performed with the catalyst (FeTPP)$_2$N (TPP=tetraphenylporphyrin) supported on silica (30 mg) and with H$_2$O$_2$ (1.14 mmol) as an oxidizer, in D$_2$O (3 mL), at 60° C. and under an air atmosphere, the reaction being tracked with $^{19}$F NMR.

The analysis of the reaction solution with $^{19}$F NMR after 8 hours showed 48 conversion of pentafluorophenol, 29% mineralization level (fluoride after reaction/initial organic fluorine) and a TON of 240 cycles per molecule of catalyst. Each catalyst molecule transform 734 organic fluorine atoms into inorganic fluorine.

Example 7

The oxidation of pentafluorophenol was performed under the conditions of Example 3, but by using the catalyst (FeTPP)$_2$N (TPP=tetraphenylporphyrine) supported on silica instead of (FePc)$_2$N.

The analysis of the reaction solution with $^{19}$F NMR after 14 hours showed 65% conversion of pentafluorophenol, 56% mineralization level (inorganic fluoride after reaction/initial organic fluorine) and a TON Of 431 cycles per molecule of catalyst. Each catalyst molecule transforms 1,870 atoms of organic fluorine into inorganic fluorine.

Example 8

2,4,6-trichlorophenol is a notoriously very unmanageable pollutant which forms in the process of bleaching paper pulp with chlorine. Earlier, mononuclear iron phthalocyanin complexes (Sorokin et al. Science, 268, 1163-1166 (1995)) and complexes of iron with a tetra-amido macrocyclic ligand (FeTAML) (Gupta et al. Science, 296, 326-328 (2002)) were described for oxidizing this not very biodegradable pollutant.

The oxidation with heterogeneous catalysis of 2,4,6-trichlorophenol (2 mL of an aqueous solution at 2.13 mM, i.e. 0.004 mmol of chlorinated compound, containing 0.1 M sulfuric acid) was performed with the catalyst (FePc)$_2$N supported on silica (20 mg, a complex load of 12 μmol/g) and with H$_2$O$_2$ (0.4 mmol) as an oxidizer, for 14 hours at 60° C.

Conversion is total and the mineralization level (inorganic chlorine after reaction/initial organic chlorine) is 95%.

Example 9

The oxidation with homogeneous catalysis of ooctafluoronaphthalene was performed with the catalyst (FePc$^t$Bu$_4$)$_2$N in CD$_3$CN for 6 hours at 60° C., with [(FePc$^t$Bu$_4$)$_2$N]=0.2 mM, [octafluoronaphtalene]=0.1 M and [H$_2$O$_2$]=1 M, i.e. the (catalyst/substrate/oxidizer) ratio=(1/500/5,000).

Conversion of octafluoronaphthalene is 35% (TON=175). The degradation products as determined by $^{19}$F NMR and GC-MS are F$^-$, difluoromaleic acid, difluorofumaric acid, tetrafluorophthalic acid, hexafluoro-1,4-naphthoquinone and heptafluoronaphthols. Each transformed molecule of octafluoronaphthalene gave 2.03 inorganic fluoride anions.

The oxidation of octafluoronaphthalene was performed under more diluted conditions with [(FePc$^t$Bu$_4$)$_2$N]=0.1 mM, [octafluoronaphthalene]=0.01 M and [H$_2$O$_2$]=0.5 M, i.e. the (catalyst/substrate/oxidizer) ratio=(1/100/5,000).

Conversion of octafluoronaphthalene is 87% (TON=87). Each transformed molecule of octafluoronaphthalene gave 6.2 inorganic fluorine anions.

Example 10

The oxidation with homogeneous catalysis of hexachlorobenzene was performed with the catalyst (FePc$^t$Bu$_4$)$_2$N in CH$_3$CN for 16 hours at 60° C. with [(FePc$^t$Bu$_4$)$_2$N]=0.05 mM, [hexachlorobenzene]=0.001 M and [H$_2$O$_2$]=0.1 M, i.e. the (catalyst/substrate/oxidizer) ratio=(1/20/2,000).

Conversion of hexachlorobenzene is 20%. Each transformed molecule of hexachlorobenzene gave 3.05 inorganic chloride anions.

Example 11

The oxidation with heterogeneous catalysis of o-dichlorobenzene (0.96 mM) was performed with the catalyst (FePc$^t$Bu$_4$)$_2$N supported on coal (30 mg) and with H$_2$O$_2$ (1.6 mmol) as an oxidizer, in 2 mL of water at 60° C. for 14 hours.

Conversion of o-dichlorobenzene is 90%. Each transformed molecule of o-dichlorobenzene gave 0.7 inorganic chloride anions. Chloromaleic and dichloromaleic acids were detected as degradation products.

Example 12

The oxidation with heterogeneous catalysis of chlorinated aliphatic compounds (dichloromethane (CH$_2$Cl$_2$), chloroform (CHCl$_3$) and 1,1,1-trichloroethane (CH$_3$CCl$_3$)) was performed with the catalyst (FePc$^t$Bu$_4$)$_2$N supported on coal (20 mg, load of complex of 10 μmol/g) in the presence of H$_2$O$_2$ (0.5 M) as an oxidizer, in aqueous solutions containing low concentrations of substrates, for 24 hours.

The results of these experiments are gathered in Table 3:

TABLE 3

Oxidation of chlorinated compounds with heterogeneous catalysis

| Chlorinated compounds | Concentration | T (° C.) | Conversion (%) | TON | Product(s) mM (yield) |
|---|---|---|---|---|---|
| $CH_2Cl_2$ | 12.7 mM | 40 | 88 | 111 | HCOOH 9.3 mM (73%) |
| $CHCl_3$ | 23.1 mM | 60 | 77 | 178 | HCOOH 18 mM (78%) |
| $CH_3CCl_3$ | 10.7 mM | 60 | 74 | 79 | HCOOH 4.7 mM (44%) $CH_3COOH$ 0.7 mM (7%) |

The main degradation product of dichloromethane and of chloroform is formic acid (HCOOH), for a yield of 73 and 78% respectively.

The mixture of formic acid (majority product) and of acetic acid ($CH_3COOH$) was obtained during degradation of $CH_3CCl_3$ indicating the cutting of the C—C bond.

These results show that the catalytic system may be used for degrading chlorinated solvents by transforming them into organic acids with high dechlorination.

The invention claimed is:

1. A method of treatment of halogenated compounds comprising a step of catalytic oxidation of said halogenated compounds in the presence of an oxidizer and a catalyst of general formula (I):

$$(L_1)M_1\text{-}X\text{-}M_2(L_2) \quad (I)$$

wherein:
 $M_1$ and $M_2$, either identical or different, represent metal atoms;
 X represents a nitrogen atom;
 $L_1$ and $L_2$, either identical or different, are coordinated with $M_1$ and $M_2$, respectively and represent ligands of the tetradentate type.

2. The method according to claim 1, wherein the oxidizer is $H_2O_2$.

3. The method according to claim 1, wherein:
 $M_1$ and $M_2$, either identical or different, represent an atom selected from the group consisting of transition metals;
 X represents a nitrogen atom;
 $L_1$ and $L_2$, either identical or different, fit the general formula (II):

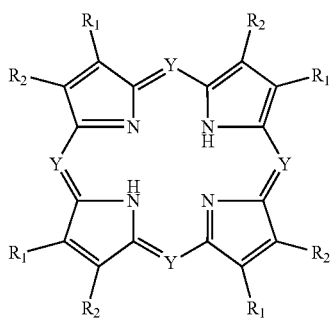

(II)

wherein:
 $R_1$ and $R_2$ represent independently of each other, a group selected from the group consisting of: H, phenyl, alkyl and halogen;
 or else form, with the two carbon atoms to which they are bound, a phenyl group or a heterocycle containing one or two nitrogen atoms;
 Y represents a nitrogen atom or a group CR, wherein R represents a hydrogen atom or a substituent selected from the group consisting of halogen, alkyl and phenyl groups.

4. The method according to claim 1, wherein:
 $M_1$ and $M_2$, either identical or different, represent an atom selected from the group consisting of iron, copper, ruthenium, manganese, chromium, vanadium, osmium and cobalt.

5. The method according to claim 3, wherein $R_1$ and $R_2$ form, with the two carbon atoms to which they are bound, a phenyl group or a heterocycle containing one or two nitrogen atoms, substituted with one or more substituent selected from the group consisting of: halogen, alkyl, alkoxy, nitro, carboxyl, hydroxyl, sulfone, sulfonic and sulfonate group.

6. The method according to claim 3, wherein Y represents a group CR, wherein R is an alkyl or a phenyl group, substituted with one or more substituent selected from the group consisting of halogen, alkyl, alkoxy, nitro, carboxyl, hydroxyl, sulfone, sulfonic and sulfonate group.

7. The method according to claim 3, wherein:
 $M_1$ and $M_2$ both represent an iron atom;
 $R_1$ and $R_2$ form, with the two carbon atoms to which they are bound, a phenyl group;
 Y represents a nitrogen atom.

8. The method according to claim 7, wherein $R_1$ and $R_2$ form with the two carbon atoms to which they are bound, a phenyl group, substituted with one or more substituent selected from the group consisting of halogen, alkyl, alkoxy, nitro, carboxyl, hydroxyl, sulfone, sulfonic and sulfonate groups.

9. The method according to claim 1, wherein the halogenated compounds are comprised in effluents.

10. The method according to claim 9, comprising the following steps:
 (a) putting the effluents, the oxidizer and the catalyst of formula (I) in the presence of each other; and
 (b) catalytically oxidizing the halogenated compounds in order to obtain oxidized compounds.

11. The method according to claim 1, wherein the halogenated compounds comprise halogenated aromatic compounds.

12. The method according to claim 1, wherein the halogenated compounds comprise fluorinated aromatic compounds.

13. The method according to claim 1, wherein the halogenated compounds comprise halogenated aliphatic compounds.

14. The method according to claim 1, wherein the halogenated compounds comprise chlorinated aliphatic compounds.

15. The method according to claim 1, wherein the catalyst is supported.

16. The method according to claim 1, wherein the catalyst is supported on silica, aluminium oxide or coal.

* * * * *